United States Patent
Huber

(10) Patent No.: US 6,896,456 B2
(45) Date of Patent: May 24, 2005

(54) LATCH UNIT

(75) Inventor: Thomas Huber, Schliersee (DE)

(73) Assignee: Telair International GmbH, Miesbach (DE)

( * ) Notice: Subject to any disclaimer, the term of this patent is extended or adjusted under 35 U.S.C. 154(b) by 0 days.

(21) Appl. No.: 10/354,799

(22) Filed: Jan. 29, 2003

(65) Prior Publication Data

US 2003/0170088 A1 Sep. 11, 2003

(30) Foreign Application Priority Data

Feb. 13, 2002 (DE) .......................................... 102 05 902

(51) Int. Cl.⁷ .............................. B64C 1/22; B60P 1/64
(52) U.S. Cl. ............................. 410/77; 410/69; 410/80; 410/94
(58) Field of Search ............................. 410/69, 70, 77, 410/80, 94, 95; 244/118.1, 118.2

(56) References Cited

U.S. PATENT DOCUMENTS

| | | | | |
|---|---|---|---|---|
| 3,741,504 A | * | 6/1973 | Alberti et al. | 244/137 R |
| 4,234,278 A | * | 11/1980 | Harshman et al. | 410/69 |
| 4,583,896 A | * | 4/1986 | Vogg et al. | 410/69 |
| 5,000,635 A | * | 3/1991 | Jensen et al. | 410/86 |
| 5,004,387 A | | 4/1991 | Jensen et al. | |
| 5,486,077 A | * | 1/1996 | Nutting | 410/69 |
| 5,950,964 A | | 9/1999 | Saggio et al. | |
| 5,957,406 A | * | 9/1999 | Nelson et al. | 410/86 |
| 6,485,238 B2 | * | 11/2002 | Segura | 410/69 |

FOREIGN PATENT DOCUMENTS

| | | | |
|---|---|---|---|
| DE | 2 161 735 | 7/1972 | |
| DE | 195 44 796 C1 | 5/1997 | |
| JP | 404208691 A | * 7/1992 | ............. 244/118.1 |

* cited by examiner

Primary Examiner—D. Glenn Dayoan
Assistant Examiner—H. Gutman
(74) Attorney, Agent, or Firm—Merchant & Gould P.C.

(57) ABSTRACT

The invention relates to a latch unit for use in an aircraft cargo hold to secure freight. The latch unit includes a claw that can be depressed out of an elevated, position in which an item of freight can be brought into an immobilizing engagement with the claw, into a resting position in which an item of freight can travel over the latch unit. The latch unit is constructed to engage freight that approaches in a direction leading out of the cargo hold and allows freight to freely move when the freight approaches from all other directions. In addition, the latch unit allows freight to rotate while in the door region, while at the same time prevents freight from accidentally rolling out of the cargo hold.

5 Claims, 3 Drawing Sheets

LATCH UNIT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a latch unit comprising a component of a loading system for a cargo hold of an aircraft.

BACKGROUND OF THE INVENTION

When the cargo hold in an aircraft is being loaded with containers, pallets or similar items of freight, the containers are conveyed into the aircraft cargo hold through a door 12, as is shown in the attached FIG. 6. In the process, the containers 10 first enter the cargo hold by rolling along ball mats 14, being driven by power drive units 18 that operate in a direction perpendicular to the long axis of the aircraft, and are then conveyed to the final storage site on roller tracks that run in the long direction of the aircraft. They are retained there by latch units 24 that engage the container's lower edges 20. Such an arrangement is disclosed in the German patent 2 161 735; the latch units described in that document are initially lowered by hand into a retracted state before loading, so that the containers can roll over them, and only thereafter are manually brought into the locking position, when the containers are standing in the right place.

To prevent damage from being caused by latch units that have accidentally been left in the raised position, latch units have been designed such as are described, e.g., in German patent DE 195 44 796 C1; when a moving container encounters such a unit, the unit is pressed downward in a direction perpendicular to the locking position, i.e. perpendicular to the edge of the container that would otherwise be engaged by the unit.

The problem is especially critical in the region near the door to the cargo hold, because relatively long items of freight or certain kinds of containers are rotated while in this region and must then be transported further in a direction 90° away from the direction in which they entered. Because of this turning movement of the freight items, the latch units present in this region must be fixed mechanically in their retracted resting position.

Another problem is that during loading and unloading of the cargo hold in an aircraft, the floor of the hold may be tilted or unintended movements of the freight may be caused in other ways, with the result that the freight can roll out of the storage hold through the door and thus endanger the personnel working there.

BRIEF SUMMARY OF THE INVENTION

It is an object of the present invention to disclose a latch unit of the type mentioned above which provides greater safety and reliability during loading of an aircraft than those of the prior art.

According to the present invention there is provided a latch unit comprising a component of a loading system for a cargo hold of an aircraft in which roller and ball units are provided on a floor of a cargo hold in such a way that items of freight can be conveyed into said hold through a door leading thereto and can be anchored at specified positions within the cargo hold, the latch unit comprising a claw that can be depressed from an elevated, operating position, in which an item of freight can be brought into an immobilizing engagement with the claw, into a resting position, in which an item of freight can travel over the latch unit, and a mechanical actuator which causes the lowering movement when the actuator is encountered by an approaching item of freight, the actuator being so constructed and the latch unit being capable of location in position in the region of the door in such a way, that when an item of freight approaches the latch unit in a direction leading out of the cargo hold and through the door, the claw remains in the operating position, whereas when approached from all other directions it is depressed into the resting position.

A distinguishing feature of the latch unit is that the actuator is so constructed, and the unit can be fastened in the region of the door in such a way, that when a freight item approaching from the direction of the cargo hold is about to pass through the door, the claw remains in the operating position, whereas when freight approaches from any other direction the claw is retracted into the resting position. This makes it possible for such latch units to be disposed in the door region (i.e., not only at the very edge) of the cargo hold. That is, if the items of freight make a turning movement in this region, the latch units are retracted so that they cannot be damaged, but if the movement is directed towards the door, i.e. out of the cargo hold, the freight item is caught by the latch units and cannot accidentally emerge from the cargo hold.

Preferably, the claw defines an engagement surface and comprises a hinged joint disposed opposite to the engagement surface, which surface and joint are each so arranged that the engagement surface can be lowered against the force of a spring-loading in a movement substantially tangential to the hinge joint from the operating position into the resting position. This simple construction ensures a high degree of stability and hence of reliability in operation.

The shape of the claw is preferably such that it appears substantially rectangular in plan view, with surfaces that slant upward from the margin toward a middle region of an upper edge of the engagement surface. These inclined surfaces thus provide, by simple means, a mechanical device that causes the claw to be lowered, because a container that is approaching (from a direction other than the direction to be blocked) contacts the inclined surface with its edge and can slide along that surface, pressing the claw downward.

The latch unit comprises a locking mechanism to hold the claw in a position at least as deeply retracted as the resting position. Thus when the contents of the cargo hold are to be removed, the claw is folded down, so that while the containers are being conveyed out, the latch unit is in an inactive position.

The locking mechanism is preferably so constructed, and the latch unit can be attached to the floor of the cargo hold in such a way, that when the claw is pressed downward from the operating position sufficiently that it is lower than the resting position by a predetermined amount, it comes into engagement with the locking mechanism and is held therein until the locking mechanism is released. As a result, by a simple means it is ensured that the claw does not become fixed by the locking mechanism when such fixation is not desired, because an item of freight has accidentally struck it and caused it to be depressed into the resting position to avoid damage.

It is especially advantageous for the latch unit in accordance with the invention to be used in a loading system for an aircraft cargo hold in which containers, pallets or similar items of freight are conveyed through a door of the hold onto a floor within it. In this case the latch unit comprises a claw that can be actuated by ramps, levers or similar actuation devices in such a way that the claw, initially in an elevated operating position in which the freight items can come into locking engagement with the claw, can be lowered into a resting position in which an item of freight can travel over the latch unit. Here the actuator is so constructed, and the latch unit can be attached in the region of the door in such a way, that when the item of freight approaches from a direction out of the cargo hold and begins to go through the door, the claw remains in the operating position, whereas when approached from all other directions the claw is lowered into the resting position. Such a security mechanism obviously offers major advantages.

The present invention will now be described in greater detail by way of example with reference to the accompanying drawings.

DETAILED DESCRIPTION OF THE INVENTION

Figure 1:
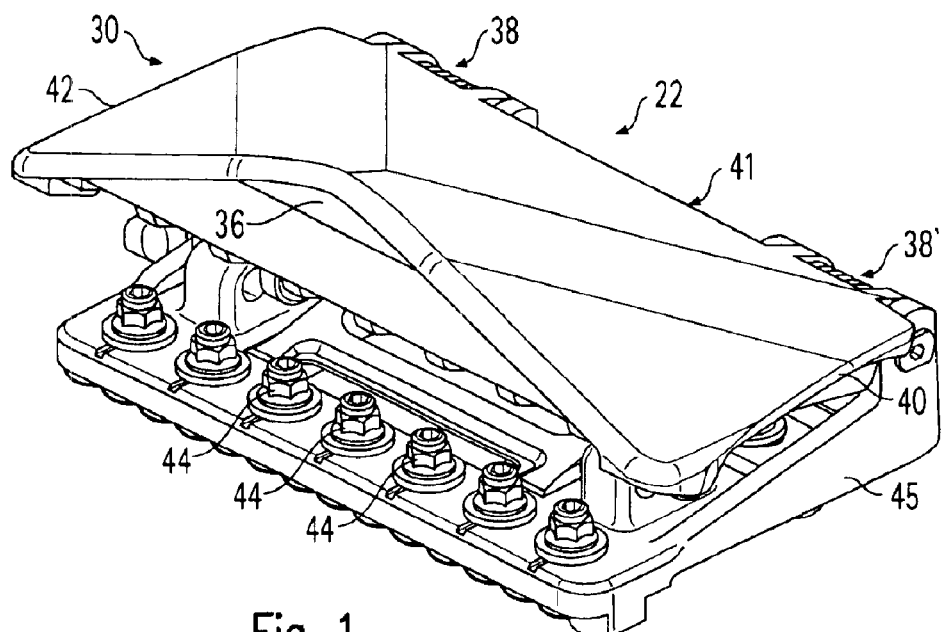
FIG. 1 is a perspective drawing of a latch unit in an elevated, operating position.

In the following description, the same reference numerals are used for identical parts or parts with identical actions.

A latch unit 22 comprises a claw 30 that is pivotably attached to a base 45 by way of a hinge 38, 38' disposed at the outer edges. In each of the two hinge joints 38, 38' a spring 39, 39' is provided, which applies an upwardly directed stress tending to drive the claw 30 away from the base 45. By way of the base 45 the latch unit 22 can be fastened to the floor of the cargo hold, in fixation devices provided there, by means of fixation bolts 44.

Figure 2:
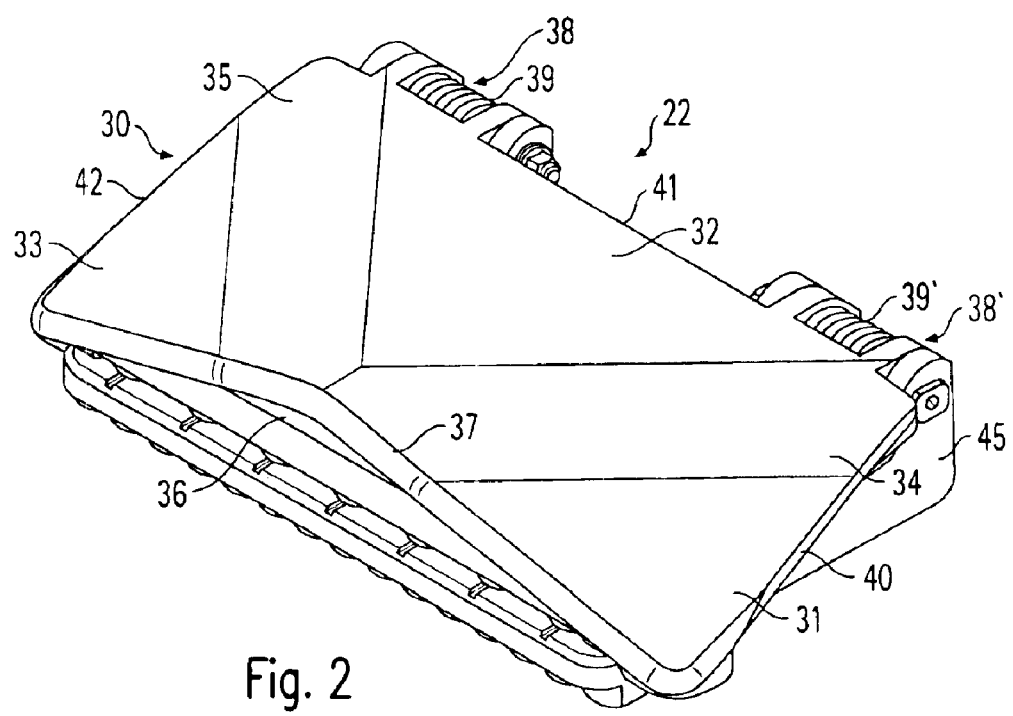
FIG. 2 is a perspective drawing of the latch unit shown in FIG. 1 in a retracted, resting position.
Figure 5:
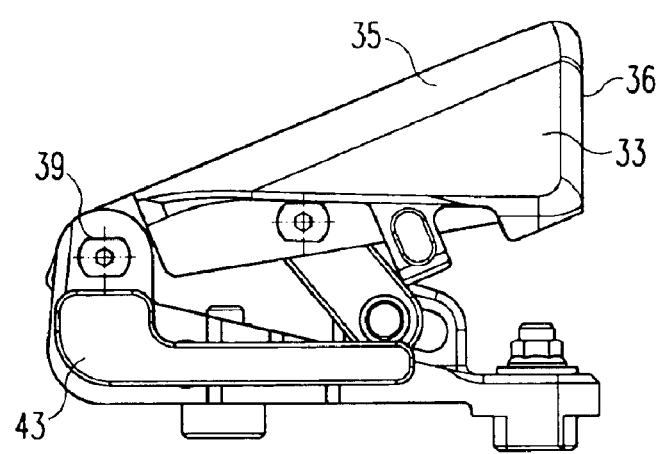
FIG. 5 is a side view of the latch unit shown in FIGS. 1 and 2 in its highest operating position.
Figure 6:
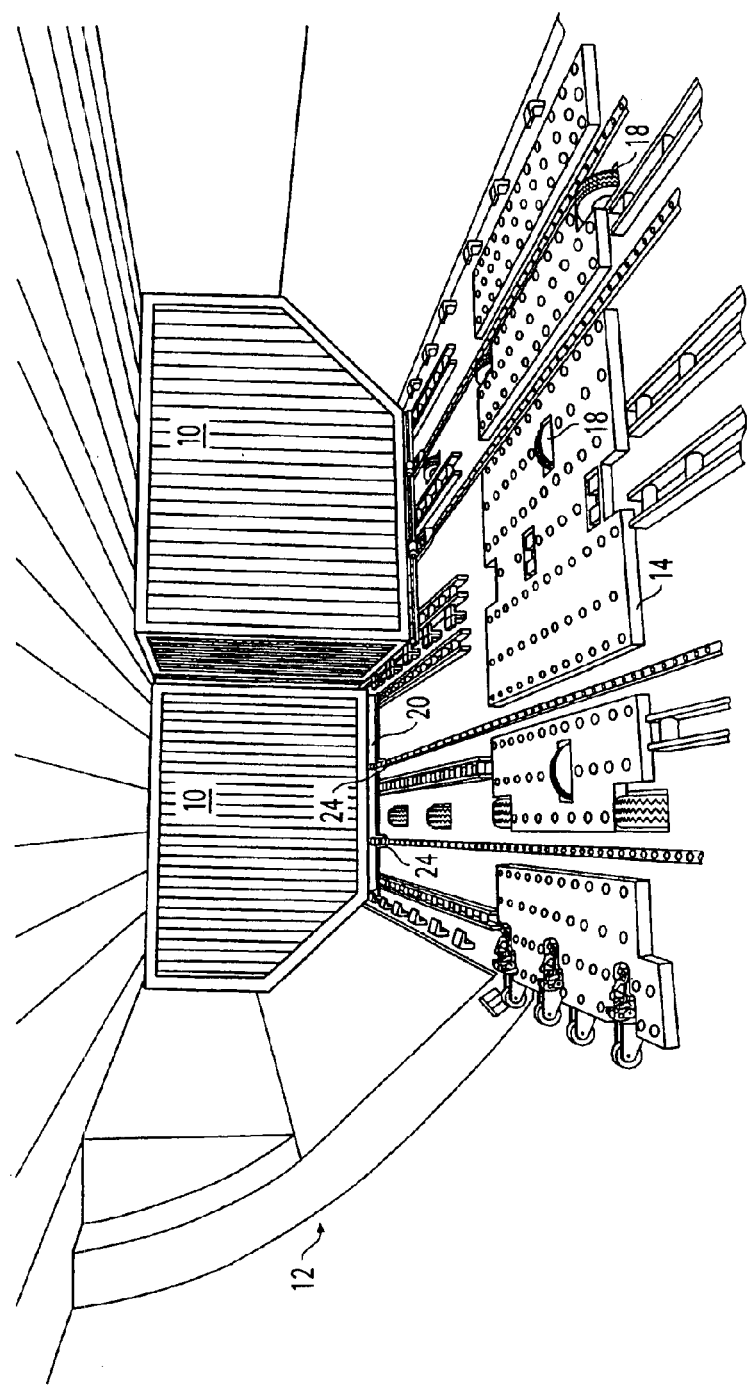
FIG. 6 shows in perspective a cargo hold of an aircraft such as is generally known.

The claw comprises an engagement surface 36 which, as can be seen in FIG. 5, is substantially perpendicular to the base 45 and hence also to the floor of the cargo hold, when the claw is in the raised operating position, as shown in FIGS. 1 and 5. The latch unit 22 also includes a mechanical actuator shown in the figures as a number of sloped surfaces 31, 32, 33, 34, and 35. In the top plan view, the claw 30 has a substantially rectangular contour; its surface is divided into several sections tilted upwards from the outer edges 40, 41 and 42. FIG. 2 shows five angled sections, (31, 34, 32, 35 and 33) that define ramp sections that are positioned relative to the engagement surface 36 about a vertical axis that runs through the latch unit 22. Namely when the latch unit 22 is viewed from above, the sloped surface 31, which forms a ramp set at 90° counterclockwise with respect to the engagement surface 36, the sloped surface 32 which forms a ramp orientated 180° counterclockwise with respect to the engagement surface 36, and the sloped surface 33, forms a ramp orientated at 270° counterclockwise with respect to the engagement surface 36. Where there would otherwise be an edge between the adjoining sloped surfaces 31 and 32, as well as 32 and 33, these edges are chamfered sufficiently to form additional sloped surface 34, which is set at 135° counterclockwise with respect to the engagement surface 36, and additional sloped surface 35, which is set at 315° counterclockwise with respect to the engagement surface 36. All the sloped surfaces 31 to 35 come together substantially in the middle of the upper edge 37 of the engagement surface 36. This overall configuration, which is very simple to produce, ensures that the claw 30 is always pushed downward whenever it is encountered by an item of freight traveling in a direction other than perpendicularly towards the engagement surface 36. Therefore it can be used in the region of the door 12 of the cargo hold (see FIG. 6) as a means of reliably preventing an item of freight from accidentally proceeding out of the cargo hold.

Figure 3:
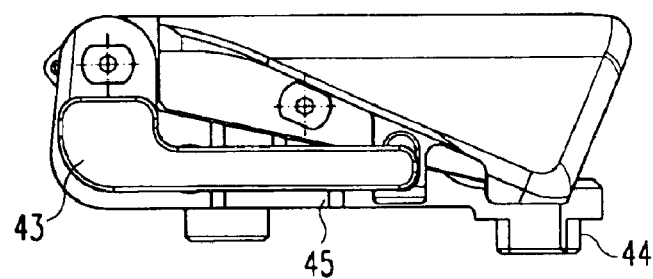
FIG. 3 is a side view of the latch unit shown in FIGS. 1 and 2 in its lowest, mechanically immobilized position.

In this situation, to enable containers to be unloaded, the latch unit is provided with a locking mechanism shown as a locking lever 43 comprising a catch mechanism that can engage a catch pin (not shown) on the claw 30 whenever the claw is pushed downward from its operating position (FIG. 5) beyond the retracted position (FIG. 4), until it reaches the depth shown in FIG. 3. In this lowest position the locking lever 43 snaps into an engaged state, retaining the claw 30 in this position so that the freight items can be unloaded from the cargo hold.

Figure 4:
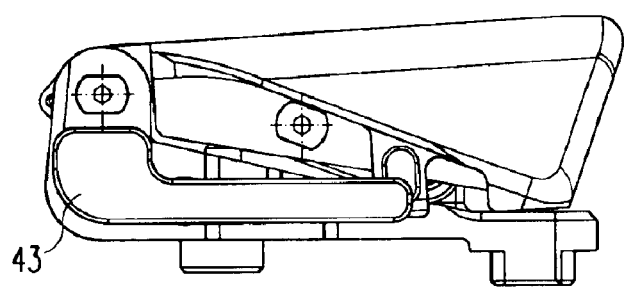
FIG. 4 is a side view of the latch unit shown in FIGS. 1 and 2 in the lowest position in which objects can travel over it but in a position wherein it is not yet immobilized.

The locking lever 43 shown in FIGS. 3, 4, and 5 engages an engagement member that is attached to the edge 42 of the latch unit. The engagement member can include a lip that engages the under edge of the locking lever when the latch unit 22 is in its locked position.

What is claimed is:

1. A latch unit for an aircraft cargo hold loading system that includes roller and ball units that are provided on a floor of the cargo hold, the latch unit comprising:

a claw that can be depressed from an operating position in which an item of freight can be brought into an immobilizing engagement with the claw, into a resting position in which the item of freight can travel over the latch unit, and a mechanical actuator which causes a lowering movement when the actuator is encountered by the approaching item of freight, the actuator being positioned in front of a cargo hold door and constructed such that when the item of freight approaches the latch unit in a direction leading out through the cargo hold door, the claw remains in the operating position, whereas when the latch unit is approached from all other directions the claw is depressed into the resting position; and a locking mechanism for retaining the claw in a retracted position wherein when the claw is retracted out of the operating position, the claw is positioned lower than the resting position until the locking mechanism is released.

2. A latch unit as claimed in claim 1 wherein the claw defines an engagement surface and comprises a hinged joint disposed opposite to the engagement surface, the surface and joint are each so arranged that the engagement surface can be lowered against the force of a spring-loading in a movement substantially tangential to the hinge joint from the operating position into the resting position.

3. A latch unit as claimed in claim 2, wherein an upper surface of the claw defines a substantially rectangular contour with sloping portions that incline upwardly toward a middle region of an upper edge of the engagement surface from outside edges of the claw.

4. A latch unit as claimed in claim 1, comprising the locking mechanism for retaining the claw in the retracted position wherein the claw is at least as depressed as in the resting position.

5. A latch unit for an aircraft cargo hold loading system that includes roller and ball units that are provided on a floor of the cargo hold, the latch unit comprising:

a claw that can be depressed from an operating position in which an item of freight can be brought into an immobilizing engagement with the claw, into a resting position, in which the item of freight can travel over the latch unit;

a mechanical actuator which causes a lowering movement when the actuator is encountered the approaching item of freight, the actuator being adapted to be positioned in a region of a cargo hold door and so constructed such that when the item of freight approaches the latch unit in a direction leading out through the cargo hold door, the claw remains in the operating position, whereas when the latch unit is approached from all other directions the claw is depressed into the resting position; and a locking mechanism for retaining the claw in a retracted position wherein the claw is at least as depressed as in the resting position wherein the locking mechanism is so constructed, and the latch unit can be attached to the floor of the cargo hold in such a way that the claw comes into engagement with the locking mechanism whenever the claw is depressed out of the operating position into a position lower by a predetermined amount than the resting position, and is thereafter retained by the locking mechanism until the locking mechanism is released.

* * * * *